Patented Feb. 21, 1950

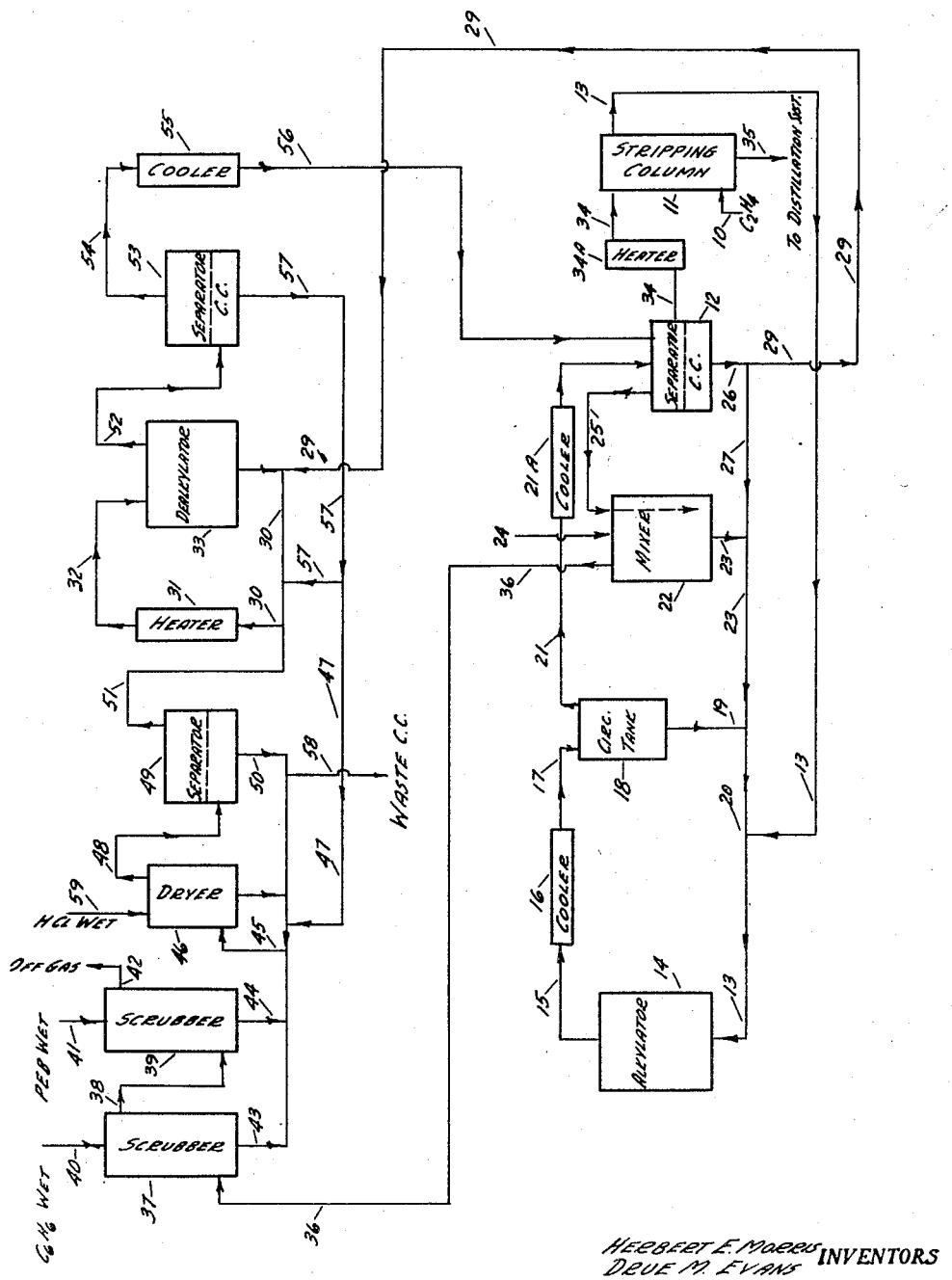

2,498,567

UNITED STATES PATENT OFFICE 2,498,567

PROCESS FOR PRODUCING ETHYLBENZENE

Herbert E. Morris, La Marque, and Drue M. Evans, Texas City, Tex., assignors to Monsanto Chemical Company, St. Louis, Mo., a corporation of Delaware Application November 14, 1946, Serial No. 709,885

2 Claims. (Cl. 260—671)

This invention provides an improved method for producing mono-alkylbenzene and in particular mono-ethylbenzene and mono-isopropylbenzene.

An object of this invention is to provide a process whereby mono-alkylbenzene may be produced in good yields employing in the process benzene, a gaseous olefin and a Friedel-Crafts reaction catalyst, such as aluminum chloride. A further object is to provide a process whereby ethylbenzene may be produced in high yields with a minimum consumption of aluminum chloride.

When an olefin such, for example, as ethylene is reacted with benzene in the presence of aluminum chloride, ethylbenzene, together with considerable quantities of polyethylbenzenes, is produced, even though the reaction is ordinarily interrupted before all of the benzene has been reacted. The reaction product obtained from the usual process contains benzene, ethylbenzene and polyethylbenzene, as well as an aluminum chloride-aromatic hydrocarbon catalyst complex. The catalyst complex resembles a heavy oil in consistency and is usually brown to black in color. Apparently all of the aluminum chloride employed as a catalyst is combined in the complex, the latter having a somewhat variable composition depending upon the reactants.

The use in this reaction of the so-called "promoters" is often resorted to in the carrying out of the present reaction. These promoters are substances such as HCl or ethyl chloride, which are added in small amounts to benzene or ethylene, or even added to the reaction liquor for the purpose of accelerating the reaction.

By reason of the high gravity of the catalyst complex described above, it is readily separated from the alkylated liquor merely by permitting the reaction liquor to stand without agitation. When a continuous process is being operated, the operation is also carried out continuously by flowing the reaction liquor into a separator which is usually a chamber of relatively large volume provided with separated draw-off lines for the lighter alkylated liquor and the heavier catalyst complex. In the usual operation, the catalyst complex is returned to the alkylator after being fortified with fresh AlCl₃ in order to revive the catalytic properties of the complex. The catalyst complex has also been employed for dealkylation wherein the polyethylbenzenes are reacted with benzene to give additional quantities of ethylbenzene.

It is well known in the art to which this invention relates that the reactants are desirably employed in the moisture-free state and in as pure a form as possible. In order to obtain the reactants in a dry and pure state, it has been suggested that they be dried prior to use, employing either azeotropic distillation or the use of various dehydrating agents externally to the process. Of these two general methods, the former has received the greatest practical application, although requiring additional heat for carrying out the process. Neither of these methods achieved the high degree of purity required in order to obtain the low consumption of aluminum chloride realized by the present process.

Our invention is based upon the discovery that moisture may be removed from benzene prior to its introduction into the alkylating zone by contacting the moist benzene with the catalyst complex after it has been separated from the alkylated liquor. We have found that not only is moisture removed from the benzene, but some HCl is transferred by the action of the moisture from the complex to the benzene and therein serves as a reaction promoter in the subsequently carried out alkylation reaction. Moreover, sulfur compounds are also removed from the benzene during this operation and remain combined with the complex. Since the catalyst complex is thereafter discarded the moisture and impurities present in the starting materials are permanently and effectively removed from the system.

Not only is it possible, according to our invention, to dry and purify benzene supplied to the alkylation zone, but it is also possible to dry and purify the polyalkylbenzene fraction, which is to be reacted with additional benzene in a dealkylation zone to yield mono-alkylbenzene. We have found, for example, that tars are effectively removed from the polyalkylbenzene fraction, thus making it unnecessary to distil these higher boiling compounds before returning them to the dealkylation part of the process.

The tar present in the crude polyalkylbenzene kills the catalytic activity of the complex quite completely and, as a matter of fact, a marked redistribution of components of the complex results. Apparently the tarry bodies enter the complex at the same time releasing benzene and mono-alkylbenzene from the complex, which then enter the top layer from which they are recovered as useful products. In this way the yield of valuable hydrocarbon is considerably increased, tars are removed from the tar-containing fraction and hydrogen chloride is transferred to the alkylation reactants in a single operation.

The influence of poisons present in the polyethylbenzene fraction on the dealkylation reaction is illustrated by the following results obtained upon three samples of polyethylbenzene. The three samples were obtained as follows:

(1) Distilled polyethylbenzene obtained by distilling a crude polyethylbenzene and collecting the product boiling over the range of 180° C. to 330° C. Engler. This distillation range is chosen in order to provide a tar-free distillate.

(2) Polyethylbenzene was treated with catalyst complex in accordance with the herein described invention.

(3) Crude polyethylbenzene containing tars and poisons was obtained from the bottoms resulting from the distillation of ethylbenzene from a sample of alkylated liquor.

In each case, these materials were agitated with the same quantity of benzene under similar conditions in the presence of a quantity of catalyst complex separated from a previous alkylation. The catalyst complex was separated from the product and the dealkylation reaction product analyzed for ethylbenzene content by distillation. This analysis showed that the three products contained the following quantities of ethylbenzene.

The ethylbenzene content is a direct measure of the extent of the dealkylation reaction taking place.

| Polyethylbenzene Source | Content of Ethylbenzene Formed by Dealkylation |
|---|---|
| | Percent |
| 1 | 22.0 |
| 2 | 23.3 |
| 3 | 11.0 |

These results show that not only is there present in crude polyethylbenzene a poison which inhibits the dealkylation reaction, which poisons may be effectively removed by distillation, but they also show that the herein disclosed method of treating polyethylbenzene with catalyst complex not only removes such poisons, but also in some way activates the polyethylbenzene so that a more favorable yield of ethylbenzene is obtained upon dealkylation.

As a result of this discovery, it is possible to efficiently combine the alkylation and the dealkylation operations in one complete, continuous process and to produce a high yield of monoalkylbenzene with a minimum consumption of aluminum chloride.

The accompanying diagrammatic flow sheet illustrates one method by which our invention may be practiced when applied to the production of mono-ethylbenzene.

In the flow sheet, ethylene is supplied by pipe 10 to stripping column 11, which in turn is supplied by way of line 34 and heater 34A with a heated solution from separator 12 of benzene, ethylbenzene and polyethylbenzene, which solution results from the alkylation reaction hereinafter described. Contact of the ethylene with the solution in column 11 results in the vaporization of appreciable amounts of benzene and minor amounts of ethylbenzene, which materials are carried in vapor form by means of pipe 13 into alkylator 14. Alkylator 14 is maintained at a temperature of 80° C. to 150° C. and contains benzene, ethylbenzene, polyethylbenzene and catalyst complex, the contents of said alkylator being constantly circulated by a pump not shown through the line 15, cooler 16, line 17, circulating tank 18, pipes 19 and 20, back to pipe 13. An additional circulation of alkylated liquor is maintained through circulation tank 18, pipe 21 containing cooler 21A, separator 12 and pipes 26, 27, 23 and 20, wherein it is mixed with a flow of reaction mixture from pipe 19, the combined flow entering alkylator 14 by pipe 13. Fresh AlCl₃ is added from time to time to mixer 22 by means of inlet 24 forming catalyst complex in mixer 22, which, being flowable, passes by means of pipes 23, 20 and 13 into alkylator 14.

Mixer 22 is also supplied by pipe 25 with a small amount of ethylene and other gases originating in separator 12. Accompanying the ethylene may be some HCl, ethyl chloride, benzene and also some fixed gases such as ethane, which gases are normally present as an impurity in the ethylene. The addition of HCl and/or ethyl chloride at this point aids in the formation of an active catalyst complex.

Separator 12 is provided with bottom draw-off pipe 26, whereby catalyst complex is continuously withdrawn, part thereof being circulated by means of pipe 27 joining pipe 23 and flowing thence by pipes 20 and 13 into alkylator 14, cooler 16 and circulating tank 18. The balance of the catalyst complex leaving pipe 26 enters pipe 29 and flows into pipe 30 connected with heater 31, pipe 32 and dealkylator 33. The indicated circulation is maintained through heater 31, whereby the temperature of the liquor is raised to a point within the range of 90° C. to 150° C., thus permitting efficient dealkylation of the polyethylbenzene to take place, forming ethylbenzene under favorable conditions in the presence of catalyst complex supplied as shown from separator 12.

Separator 12, wherein a gravity separation of catalyst complex from alkylated liquor is made, furnishes a supply of alkylated liquor flowing by means of pipe 34 containing heater 34A to stripping column 11. The alkylated liquor comprises benzene, ethylbenzene and polyethylbenzene in the proportions of approximately 53% benzene, 34% ethylbenzene and 13% polyethylbenzene and is heated to the required temperature in heater 34A and supplied to stripping column 11. Due to the contacting of this liquor with ethylene gas, evaporation of a large portion of benzene and a relatively smaller amount of ethylbenzene occurs, so that the product leaving the stripper is relatively low in benzene and consequently is thereafter more readily fractionated in order to separate the constituents in said liquor. For example, the product which leaves the stripper column 11 by pipe 35 usually contains in the neighborhood of 18% benzene, 56% ethylbenzene and 26% polyethylbenzene. This liquor, after washing to destroy any catalyst complex therein, passes into a pair of conventional distillation columns not shown, wherein a fractionation of the product results in separate fractions of benzene, ethylbenzene and polyethylbenzene. In view of the subsequent treatment of the polyethylbenzene herein provided, it is not necessary to remove the tars from the polyethylbenzene by distillation. The benzene and polyethylbenzene are returned to the system for further treatment, while the ethylbenzene is the desired product of the process.

Fixed gases, unabsorbed ethylene, HCl, ethyl chloride and benzene vapors are vented from mixer 22 by pipe 36, which conducts these gases into scrubber 37, wherein they are contacted with benzene, whence HCl and ethyl chloride are removed from the gases and dissolved in the benzene, after which the residual gases pass into pipe 38 and are conducted thereby into a second scrubber 39, wherein the gases are contacted with polyethylbenzene. As shown in the drawing, scrubbers 37 and 39 are supplied with benzene and polyethylbenzene, respectively, from an external source not shown by means of inlet pipes 40 and 41. The benzene supplied to pipe 40 may be wet benzene. The polyethylbenzene obtained from the ethylbenzene still and containing tars is supplied to pipe 41 and may also contain some moisture. Any inert gas, not dissolved either by benzene or polyethylbenzene, in scrubbers 37 and 39, escapes from the system by means of pipe 42 and is vented to the atmosphere or otherwise disposed of.

The benzene containing dissolved HCl and ethyl chloride leaves scrubber 37 by pipe 43, while the polyethylbenzene containing dissolved benzene leaves scrubber 39 by means of pipe 44, both entering pipe 45, wherein they are mixed and flow to dryer 46. This piece of apparatus is merely a tank of suitable size equipped with a stirrer. Catalyst complex, which has been previously used to dealkylate polyethylbenzene, enters the dryer 46 by means of pipes 47 and 45, mixes with the benzene and polyethylbenzene, drying and purifying the same and flows out together with the dried and purified product by means of pipe 48, enters separator 49, wherein catalyst complex and the dried and purified liquor are separated into a lower and an upper layer. The lower layer leaves separator 49 by pipe 50 and flows into pipe 45, returning thereby to dryer 46. The upper layer leaving pipe 49 by pipe 51 consists of a dried and purified solution of benzene and polyethylbenzene, which enters pipe 30 and thence heater 31. The relative amounts of benzene and polyethylbenzene entering the system by means of pipes 40 and 41 are preferably maintained in the approximate ratio of 468 pounds of the former to 175 pounds of the latter. The flow of catalyst complex into dealkylator 33 is so regulated that approximately four times as much catalyst complex by weight as benzene plus polyethylbenzene is present in dealkylator 33.

The material leaving dealkylator 33 by pipe 52 consists of dealkylated liquor and catalyst complex. A gravity separation of the constituents thereof is effected in separator 53, the lighter dealkylated liquor leaving by means of pipe 54 passing to cooler 55 and then flowing by pipe 56 into separator 12. By cooling the material in cooler 55 to about 30° C. some additional catalyst complex is separated out and a further gravity separation made of this material in separator 12.

The catalyst complex leaving separator 53 by means of pipe 57 is divided into two parts, one part flowing by means of pipe 57 into pipe 30 to be reused for dealkylation, whereas the remainder passes into pipe 47, then into pipe 45, and thence into dryer 46. The amount of catalyst complex circulating in dryer 46 and separator 49 is maintained substantially constant by the withdrawal of approximately equal amounts of spent catalyst complex from separator 49 by means of pipes 50 and 58.

In a pilot plant test of the present process 2610 parts of wet benzene per hour and 870 parts of polyethylbenzene containing tar which had been recovered by distillation from the alkylated liquor obtained from stripping column 11 were passed to dryer 46, wherein this material was contacted with 60.6 parts per hour of catalyst complex obtained from separator 53. The separator produced 3480 parts per hour of dried and purified benzene and polyethylbenzene mixture, which was supplied to dealkylator 33 and which then entered separator 53. This device separated the dealkylated liquor into a light liquor at the rate of 3480 parts per hour, the liquor containing in suspension 10.4 parts of catalyst complex, this mixture then passing through cooler 55 and by means of pipe 56 entering separator 12. At the same time 536 parts by weight of ethylene entered stripping column 11 by pipe 10, which vaporized and carried 2500 parts of benzene by means of pipe 13 into alkylator 14. There was added 22.5 parts per hour of AlCl₃ at inlet 24. Separator 12 treated 3036 parts of alkylated liquor and 80.1 parts of catalyst complex per hour entering by pipe 21, together with 3480 parts of dealkylated liquor entering by pipe 56. The separator produced a light fraction at the rate of 6516 parts of liquor, which left by pipe 34 and entered stripping column 11. In stripping column 11 this was reduced by evaporation to 4016 parts per hour of alkylated liquor which was distilled. The distillation of this alkylated liquor resulted in the recovery of 1108 parts of benzene, 2038 parts of ethylbenzene and 870 parts of polyethylbenzene. The indicated composition of the product was therefore as follows:

| | Per cent by weight |
|---|---|
| Benzene | 27.6 |
| Ethylbenzene | 50.7 |
| Polyethylbenzene | 21.7 |

Since 2038 parts of ethylbenzene was produced with a consumption of 22.4 parts of AlCl₃ the process consumed AlCl₃ at the rate of 11 parts of AlCl₃ per 1000 parts of ethylbenzene produced.

Should it be desirable to increase the amount of HCl present in the feed to the dealkylator 33 over that normally transferred to the hydrocarbon phase in the dryer 46 by the action of the catalyst complex, aqueous HCl in appropriate quantities may be introduced into dryer 46 by means of pipe 59.

By the means herein described, a high yield of ethylbenzene is obtained utilizing a small amount of AlCl₃. Tests of our process have shown a consumption of less than 11 pounds of AlCl₃ per 1000 pounds of ethylbenzene produced.

The present process may, of course, be employed for the production of any mono-alkylbenzene from a gaseous olefin such as ethylene, propylene, butylene, amylene, etc., and various changes may be made in the operating conditions without departing from the spirit of the invention. Accordingly, the scope of the present invention is to be construed in accordance with the appended claims.

What we claim is:

1. In the process for producing monoalkylbenzene wherein an olefin and benzene are combined in the presence of an aromatic hydrocarbon catalyst complex composed in part of AlCl₃ to form a monoalkylbenzene and a tar-containing polyalkylbenzene fraction, the steps of separating said aromatic hydrocarbon catalyst complex from said mixture of monoalkylbenzene and said tar-containing polyalkylbenzene fraction and then contacting said separated aromatic hydrocarbon catalyst complex with said tar-containing polyalkylbenzene fraction, whereby tar is removed from said polyalkylbezene fraction and combined in said complex and the so-formed tar-containing catalyst complex separated from said polyalkylbenzene fraction and thereafter separately dealkylating said polyalkylbenzene fraction in the presence of catalyst complex resulting from the said first described separation.

2. In the process for producing ethylbenzene wherein ethylene and benzene are combined in the presence of an aromatic hydrocarbon catalyst complex composed in part of $AlCl_3$ to form ethylbenzene and a tar-containing polyethylbenzene fraction, the steps of separating said aromatic hydrocarbon catalyst complex from said mixture of ethylbenzene and said tar-containing polyethylbenzene fraction and then contacting said separated aromatic hydrocarbon catalyst complex with said tar-containing polyethylbenzene fraction, whereby tar is removed from said polyethylbenzene fraction and combined in said complex and the so-formed tar-containing catalyst complex separated from said polyethylbenzene fraction and thereafter separately dealkylating said polyethylbenzene fraction in the presence of catalyst complex resulting from the said first-described separation.

HERBERT E. MORRIS.
DRUE M. EVANS.

REFERENCES CITED

The following references are of record in the file of this patent:

UNITED STATES PATENTS

| Number | Name | Date |
|---|---|---|
| 2,373,062 | Stahly | Apr. 3, 1945 |
| 2,377,243 | Kimberlin, Jr. | May 29, 1945 |
| 2,378,733 | Sensel | June 19, 1945 |
| 2,384,295 | Gaylor | Sept. 4, 1945 |